United States Patent
Daniels et al.

(10) Patent No.: US 10,323,793 B2
(45) Date of Patent: Jun. 18, 2019

(54) MOUNTING BRACKET

(71) Applicant: WINDOWCRAFT, INC., Garden City Park, NY (US)

(72) Inventors: Joseph J. Daniels, Roslyn Heights, NY (US); Edward Oblen, Hackettstown, NJ (US); Man Phan, Astoria, NY (US); Fang Lin, Staten Island, NY (US)

(*) Notice: Subject to any disclaimer, the term of this patent is extended or adjusted under 35 U.S.C. 154(b) by 0 days.

(21) Appl. No.: 15/146,593

(22) Filed: May 4, 2016

(65) Prior Publication Data

US 2017/0321842 A1 Nov. 9, 2017

(51) Int. Cl.
| | | |
|---|---|---|
| *F16M 13/02* | (2006.01) | |
| *A47H 1/12* | (2006.01) | |
| *A47H 1/13* | (2006.01) | |
| *E06B 9/50* | (2006.01) | |
| *E06B 9/42* | (2006.01) | |
| *E06B 9/174* | (2006.01) | |
| *A47H 1/14* | (2006.01) | |
| *A47H 1/142* | (2006.01) | |

(52) U.S. Cl.
CPC ........... *F16M 13/027* (2013.01); *A47H 1/12* (2013.01); *A47H 1/13* (2013.01); *E06B 9/50* (2013.01); *A47H 1/14* (2013.01); *A47H 1/142* (2013.01); *E06B 9/174* (2013.01); *E06B 9/42* (2013.01)

(58) Field of Classification Search
CPC ..... E06B 9/40; E06B 9/42; E06B 9/50; E06B 9/174; E06B 9/323; A47H 1/14; A47H 1/13; A47H 1/142; A47H 1/144; A47H 1/16; A47H 1/12; A47H 1/10; A47H 1/102; A47H 1/122; F16M 13/02
USPC ..... 248/201, 220.22, 223.31, 252, 254, 266, 248/269, 268, 224.8, 207, 220.42
See application file for complete search history.

(56) References Cited

U.S. PATENT DOCUMENTS

| | | | | |
|---|---|---|---|---|
| 1,476,160 A | * | 12/1923 | Kirsch ............... | E06B 9/50 160/23.1 |
| 2,013,500 A | * | 9/1935 | O'Connor ........... | E06B 9/50 248/269 |
| 2,486,996 A | * | 11/1949 | Stuber ................ | E06B 9/323 248/264 |
| 2,524,711 A | * | 10/1950 | Nelson ............... | E06B 9/323 160/34 |
| 2,974,918 A | * | 3/1961 | Voigtlander ........ | A47B 57/46 248/201 |
| 3,005,615 A | * | 10/1961 | McKay .............. | A47H 1/122 248/263 |
| 3,102,584 A | * | 9/1963 | Znamirowski ..... | E06B 9/44 160/300 |
| 4,179,091 A | * | 12/1979 | Bidney .............. | A47H 1/144 248/265 |
| 4,223,714 A | * | 9/1980 | Weinreich .......... | E06B 9/50 160/298 |

(Continued)

*Primary Examiner* — Jonathan Liu
*Assistant Examiner* — Taylor L Morris
(74) *Attorney, Agent, or Firm* — Polsinelli PC

(57) ABSTRACT

A mounting bracket having a base plate with a first set of apertures and a second set of apertures formed therein. A mounting plate couplable with one of the first set of apertures and the second set of apertures formed in the base plate. A bracket housing couplable with the base plate and having an inner surface and an outer surface. A retainer assembly coupled with the base plate and adjacent to and abuttingly engaged with the bracket housing.

18 Claims, 8 Drawing Sheets

(56) References Cited

U.S. PATENT DOCUMENTS

| | | | | |
|---|---|---|---|---|
| 4,224,974 | A * | 9/1980 | Anderson | E06B 9/323 160/178.1 R |
| 4,270,720 | A * | 6/1981 | Fukuchi | A47H 1/142 248/257 |
| 4,399,855 | A * | 8/1983 | Volfson | E06B 9/11 160/23.1 |
| 4,453,688 | A * | 6/1984 | Nakajima | E06B 9/50 248/254 |
| 4,538,785 | A * | 9/1985 | Damsgaard | E06B 9/50 248/268 |
| 4,572,467 | A * | 2/1986 | Farrell | E06B 9/50 248/257 |
| 4,711,437 | A * | 12/1987 | Longenecker | B23Q 3/103 269/100 |
| 4,738,420 | A * | 4/1988 | Angle | B60R 11/0205 248/27.1 |
| 4,884,618 | A * | 12/1989 | Steeves | E06B 9/60 160/321 |
| 5,195,570 | A * | 3/1993 | Marocco | E06B 9/323 16/94 R |
| 5,609,196 | A * | 3/1997 | Kraler | E06B 9/17061 160/23.1 |
| 6,196,508 | B1 * | 3/2001 | Nijs | A47H 1/13 248/267 |
| 6,643,945 | B1 * | 11/2003 | Starks | E04G 21/185 248/207 |
| 6,782,938 | B2 * | 8/2004 | Colson | E06B 9/32 160/121.1 |
| 6,935,401 | B2 * | 8/2005 | Fraczek | E06B 9/50 160/321 |
| 7,854,419 | B2 * | 12/2010 | Ng | E06B 9/50 160/323.1 |
| 7,891,399 | B2 * | 2/2011 | Rasmussen | E06B 9/42 160/120 |
| 8,122,932 | B2 * | 2/2012 | Cannaverde | E06B 9/174 160/120 |
| 8,151,859 | B2 * | 4/2012 | Koop | E06B 9/50 160/325 |
| 8,201,789 | B1 * | 6/2012 | Chou | E06B 9/32 160/902 |
| 8,382,050 | B2 * | 2/2013 | Koop | E06B 9/50 248/220.22 |
| 8,403,289 | B1 * | 3/2013 | Rinderer | H02G 3/126 174/480 |
| 8,480,048 | B2 * | 7/2013 | Krantz-Lilienthal | F16B 2/245 160/23.1 |
| 8,608,126 | B2 * | 12/2013 | Ng | E06B 9/50 160/323.1 |
| 8,967,227 | B2 * | 3/2015 | Chou | A47H 1/14 160/23.1 |
| 9,138,093 | B1 * | 9/2015 | Chou | E06B 9/50 |
| 9,303,707 | B2 * | 4/2016 | Fraczek | F16D 67/02 |
| 2006/0272782 | A1 * | 12/2006 | Nichols, Jr. | A47H 5/0325 160/120 |
| 2011/0006176 | A1 * | 1/2011 | Krantz-Lilienthal | F16B 2/245 248/205.1 |
| 2011/0139381 | A1 * | 6/2011 | Daniels | E06B 9/50 160/298 |
| 2011/0139382 | A1 * | 6/2011 | Daniels | E06B 9/50 160/309 |
| 2012/0090795 | A1 * | 4/2012 | Kirby | E06B 9/40 160/307 |
| 2012/0160975 | A1 * | 6/2012 | Cannaverde | E06B 9/174 248/208 |
| 2013/0105649 | A1 * | 5/2013 | Wills | E06B 9/42 248/224.8 |
| 2013/0284383 | A1 * | 10/2013 | Feldstein | E06B 9/50 160/311 |
| 2013/0312920 | A1 * | 11/2013 | Mullet | E06B 9/40 160/310 |
| 2014/0166218 | A1 * | 6/2014 | Ng | E06B 9/42 160/120 |
| 2014/0262067 | A1 * | 9/2014 | Higgins | E06B 9/174 160/120 |
| 2014/0299729 | A1 * | 10/2014 | Wills | E06B 9/50 248/254 |
| 2015/0027059 | A1 * | 1/2015 | Lu | E06B 9/582 49/70 |

* cited by examiner

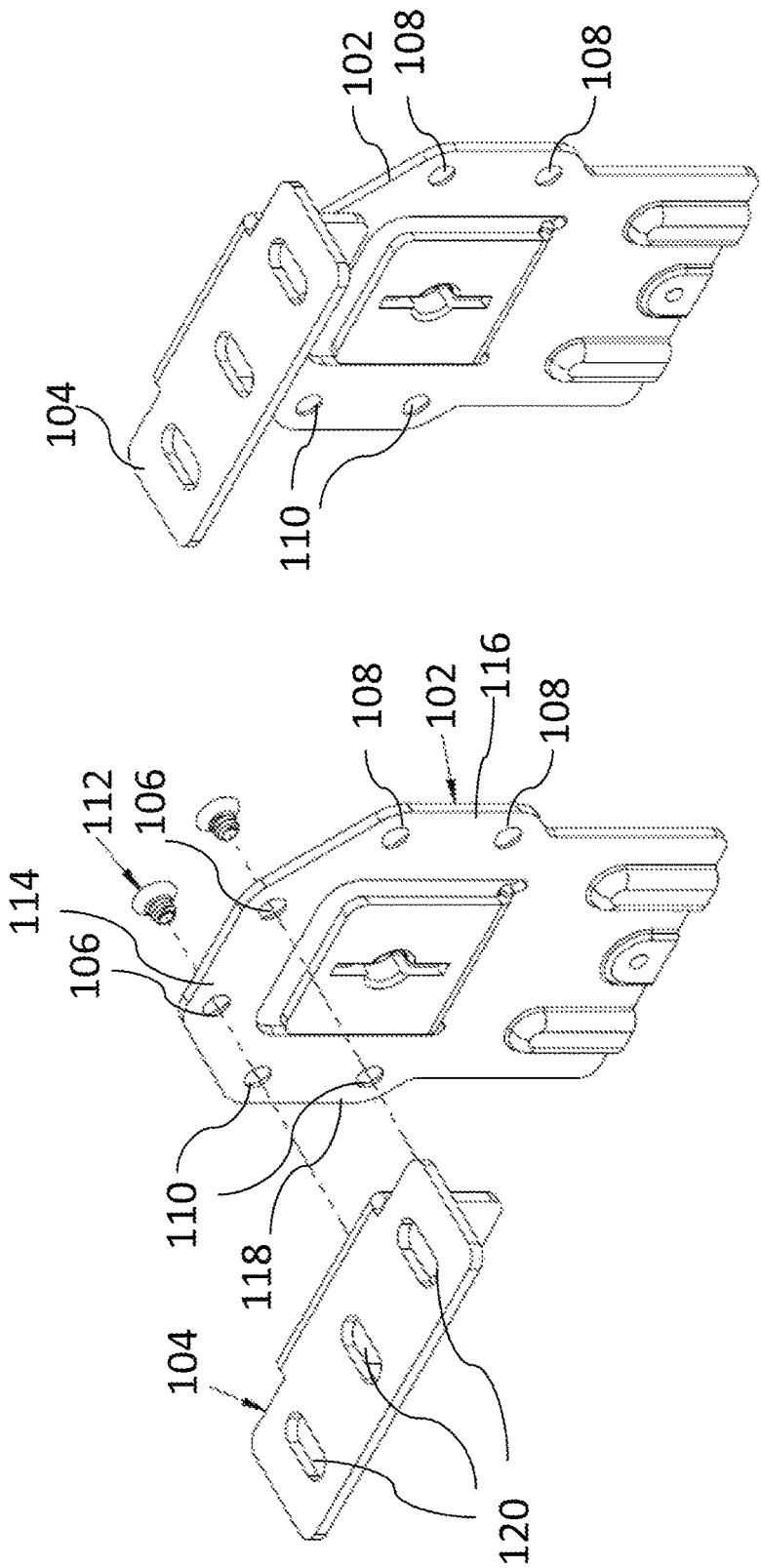

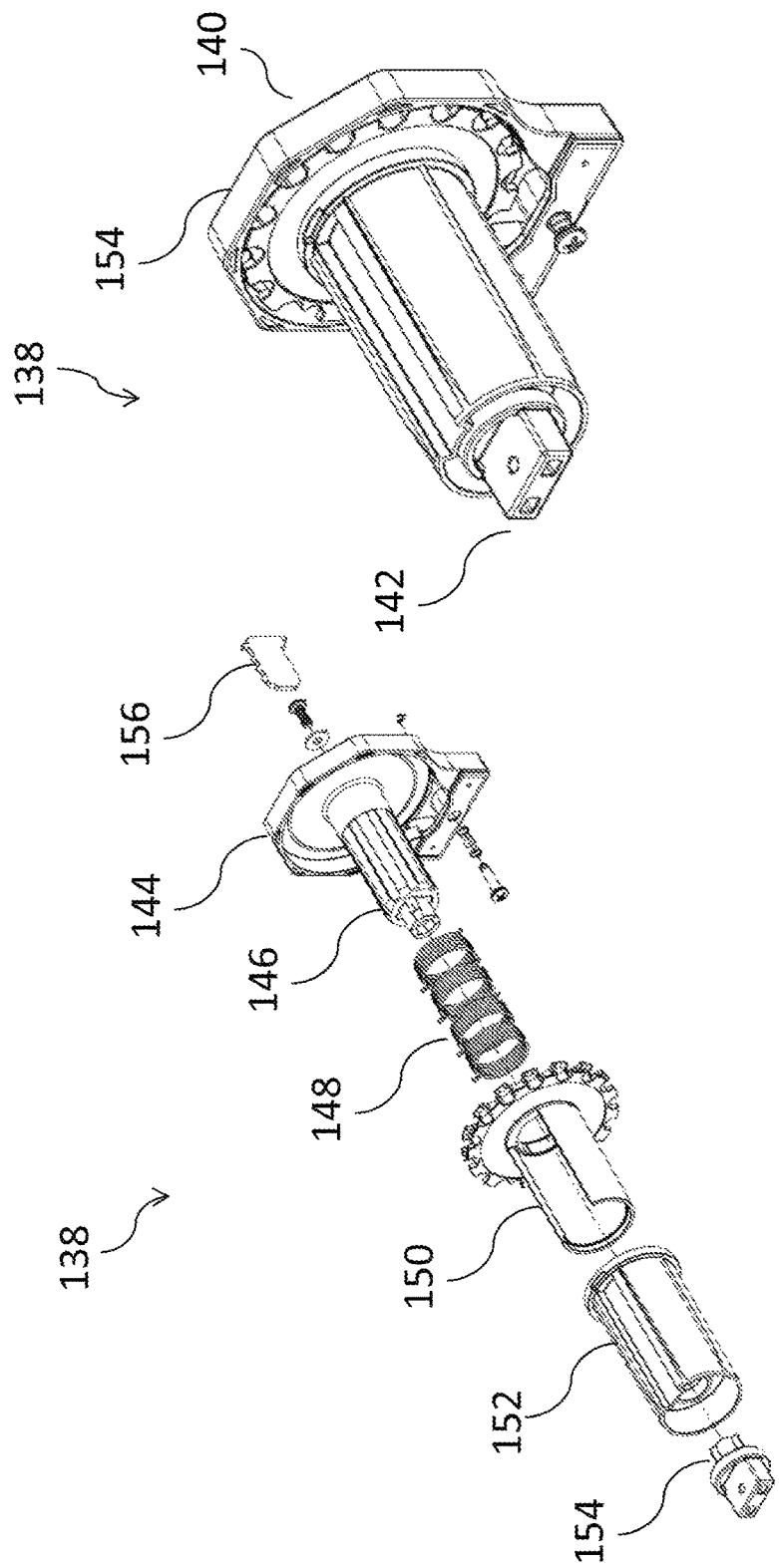

US 10,323,793 B2

MOUNTING BRACKET

FIELD

The subject matter herein is directed to a mounting bracket, more specifically a mounting bracket for a window covering, and further relates to a mounting bracket, clutch and idler for operating and positioning the window covering.

BACKGROUND

Window coverings are generally mounted to a wall, ceiling, or other fixture using a bracket configured to receive the window covering. The bracket provides support and allows the window covering to transition from a deployed position to an un-deployed position. A different bracket is generally required for each mounting situation.

SUMMARY OF THE INVENTION

A mounting bracket having a base plate with a first set of apertures and a second set of apertures formed therein. A mounting plate couplable with one of the first set of apertures and the second set of apertures formed in the base plate. A bracket housing couplable with the base plate and having an inner surface and an outer surface. The inner surface of the bracket housing can be shaped to receive a correspondingly shaped clutch assembly. A retainer assembly coupled with the base plate and adjacent to and abuttingly engaged with the bracket housing. The base plate can be coupled with the bracket housing by one or more fasteners. The base plate can also be coupled with the bracket housing by a press fit arrangement.

The mounting bracket can also have a third set of apertures formed in the base plate and the mounting plate selectively couplable with one of the first set of apertures, second set of apertures, and the third set of apertures. The first set of apertures can be formed proximate a top edge of the base plate, the second set of apertures can be formed proximate a right edge of the base plate, and the third set of apertures can be formed proximate a left edge of the base plate.

The retainer assembly can be a clutch plate configured to receive a clutch side of a clutch assembly. The clutch plate can have a slot configured to receive the clutch assembly. The retainer assembly can also be an idle plate configured to receive an idle side of an idle assembly. The idle plate can have an idle aperture configured to receive the idle assembly.

In the illustrated embodiment, the base plate can be configured to receive a joiner plate in one of the second set of apertures, and the third set of apertures, the joiner plate coupling the base plate with a second base plate.

The mounting bracket can be configured to receive a second retainer assembly configured to receive a second clutch assembly.

A mounting bracket system having a first mounting bracket and a second mounting bracket. The first mounting bracket having a base plate with a first set of apertures and a second set of apertures formed therein. A mounting plate couplable with one of the first set of apertures and the second set of apertures formed in the base plate. A bracket housing couplable with the base plate and having an inner surface and an outer surface. A clutch plate coupled with the base plate and adjacent to and abuttingly engaged with the bracket housing.

The second mounting bracket having a base plate with a first set of apertures and a second set of apertures formed therein. A mounting plate couplable with one of the first set of apertures and the second set of apertures formed in the base plate. A bracket housing couplable with the base plate and having an inner surface and an outer surface. An idle plate coupled with the base plate and adjacent to and abuttingly engaged with the bracket housing.

A longitudinally extending clutch assembly disposed between the first mounting bracket and the second mounting bracket. The clutch plate is configured to receive a clutch side of the clutch assembly, and the idle plate is configured to receive the idle side of an idle assembly.

BRIEF DESCRIPTION OF THE DRAWINGS

Implementations of the present technology will now be described, by way of example only, with reference to the attached figures. The disclosure will be readily understood by the following detailed description in conjunction with the accompanying drawings, wherein like reference numerals designate like structural elements, and in which:

FIG. 1A is an exploded view of a base plate and a mounting plate of a mounting bracket in accordance with the present disclosure;

FIG. 1B is an assembled view of the mounting plate and mounting bracket of FIG. 1A;

FIG. 5A is an exploded view of a clutch assembly in accordance with the present disclosure;

FIG. 5B is an assembled view of the clutch assembly of FIG. 5A;

DETAILED DESCRIPTION

Figure 2B:
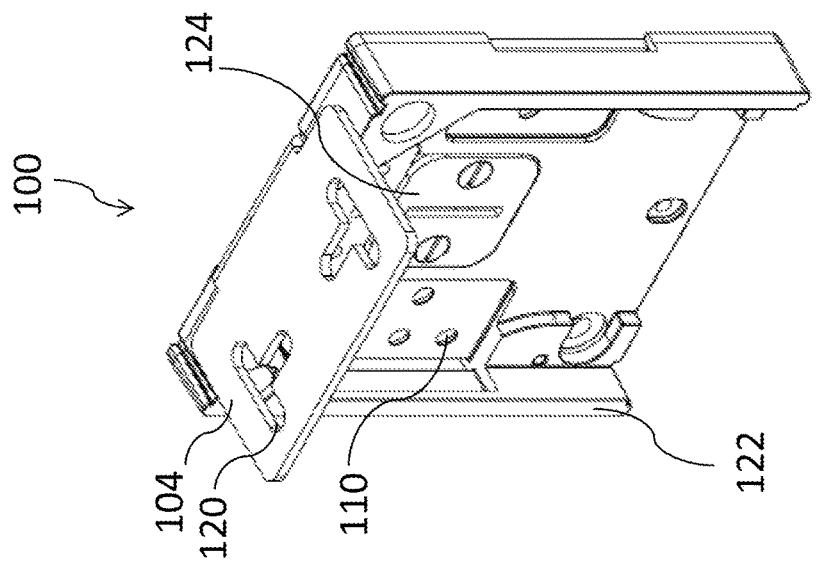
FIG. 2B is an assembled view of the mounting bracket of FIG. 2A.

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. Coupled, as used herein, can refer to the linking or connection of two objects. The coupling can be direct or indirect. An indirect coupling includes connecting two objects through one or more intermediary objects. Coupling can also refer to electrical or mechanical connections. Coupling can also include magnetic linking without physical contact. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The present disclosure is directed to a mounting bracket. The mounting bracket can have a base plate with a first set of apertures and a second set of apertures formed therein. A mounting plate can be coupled to the base plate via one of the first set of apertures and the second set of apertures formed in the base plate. A bracket housing, having an inner surface and an outer surface, can be coupled with the base plate. The mounting bracket can also include a retainer assembly coupled with the base plate and adjacent to and abuttingly engaged with the bracket housing.

The mounting bracket can form a mounting bracket system having a first mounting bracket and a second mounting bracket for hanging a window covering. The first mounting bracket can be configured to receive a clutch assembly of a window covering and the second mounting bracket can be configured to receive the idle end of a idle assembly and window covering.

While the present disclosure is described with respect to a mounting bracket for a window covering, it within the scope of this disclosure to implement the mounting bracket and relating system for mounting and supporting any number of elements.

FIGS. 1A and 1B illustrate a base plate 102 and a mounting plate 104 of a mounting bracket, in accordance with embodiments of the disclosure. The base plate 102 can have a first set of apertures 106, a second set of apertures 108, and a third set of apertures 110 formed therein. The combination of the first set of apertures 106, the second set of apertures 108, and the third set of apertures 108 allows for a variety of mounting positions including a ceiling mount, a right side mount, and a left side mount for a window covering. As such, an individual mounting bracket can be used to hang a window covering via a number of mounting positions, thereby making the mounting bracket suitable for use with a wide variety of window configurations. This can reduce manufacturing costs because a single bracket design can be for multiple mounting orientations.

The mounting bracket further includes a mounting plate 104 that can be coupled to the base plate 102 by a plurality of fasteners 112 at one of the first set of apertures 106, the second set of apertures 108, and the third set of apertures 110. The mounting plate 104 can be substantially L-shaped to provide a mounting surface perpendicular to the base plate 102. The mounting plate 104 can be couplable with the base plate 102 at one of the first set of apertures 106, second set of apertures 108, or third set of apertures 110, thereby providing the mounting surface proximate to different sides of the base plate 102. In some embodiments, the mounting plate 104 coupled with first set of apertures 106 can provide a ceiling mount, coupled with the second set of apertures 108 can provide a right side mount, and coupled with the third set of apertures 110 can provide a left side mount. The mounting plate 104 can be of any shape or configuration to couple with the base plate and provide a mounting surface in a different location from the base plate. By way of example, without intending to be limiting, in some embodiments the base plate 102 can be mounted on wall while the mounting plate 104 can be coupled with the base plate 102 to provide a mounting surface for a ceiling mount. Other configurations are possible. While the present disclosure is drawn to a substantially L-shaped mounting plate, the mounting plate can alternatively be substantially Z-shaped, substantially T-shaped, or any other configuration to position the mounting surface relative to the base plate 102. While the illustrated embodiment details two fasteners 112, the present disclosure can be implemented with any number of fasteners 112 such as three, four, or more. The fasteners 112 can be screws, as shown, push pin fasteners, nails, bolts, or any other suitable fastener known to one of ordinary skill in the art.

The first set of apertures 106 can be formed near a top edge 114 of the base plate 102, the second set of apertures 108 can be formed near a right edge 116 of the base plate 102, and the third set of apertures 110 can be formed near a left edge 118 of the base plate 102. The positioning of the first set of apertures 106, the second set of apertures 108, and the third set of apertures 110 can allow the mounting plate 104 to be selectively coupled with the base plate 102 depending on the mounting position of a window covering (not shown). The base plate 102 can have two sets of apertures or more than three sets of apertures disposed on various edges of the base plate 102 depending on the shape, arrangement, and desired mounting positions of the mounting bracket 100 (shown in FIGS. 2A and 2B).

In some embodiments, the first set of apertures 106, the second set of apertures 108, and/or the third set of apertures 110 can each include a row of apertures that are disposed on the base plate 102 such that when the mounting plate 104 is coupled thereto the mounting surface is within a plane of the base plate 102 (i.e. the plane of the mounting surface intersects with an edge of the base plate 102). In other embodiments, the mounting plate 104 can have a matrix of apertures to couple with the first set of apertures 106, the second set of apertures 108, and the third set of apertures 110 such that the mounting plate 104 can be coupled to the base plate to be within a plane of the base plate or to extend beyond a plane of the base plate. In such embodiments, a first row of apertures in the matrix formed in the mounting plate 104 is disposed such that when the first set of apertures 106, the second set of apertures 108, and/or the third set of apertures 110 are coupled thereto the mounting surface is within a plane of the base plate. A second row of apertures in the matrix formed in mounting plate 104 is disposed such that when the first set of apertures 106, the second set of apertures 108, and/or the third set of apertures 110 are coupled thereto, the mounting surface is extended beyond a plane of the base plate 102 (i.e. the plane of the mounting surface does not intersect with an edge of the base plate). In some embodiments, the mounting surface can extend beyond a plane of the base plate 102 by ⅛", in other embodiments by ¼", and in still other embodiments by ⅜".

In other embodiments, the base plate 102 can have a matrix of apertures formed at each of the first set of apertures 106, the second set of apertures 108, and/or third set of apertures 110, such that when the mounting plate 104 is coupled thereto the mounting surface is within the same plane of the base plate 102, or alternatively extends beyond the plane of the plate 102 by 1/8", in other embodiments by 1/4", and in still other embodiments by 3/8".

The mounting plate 104 can have a plurality of mounting apertures 120 formed therein to receive one or more fasteners for coupling the mounting bracket 100 to a ceiling, wall, or adjacent structure. In some embodiments, the mounting bracket 100 can be configured to receive a manual shade window covering, in other embodiments, the window covering can be a motorized shade.

Figure 2A:
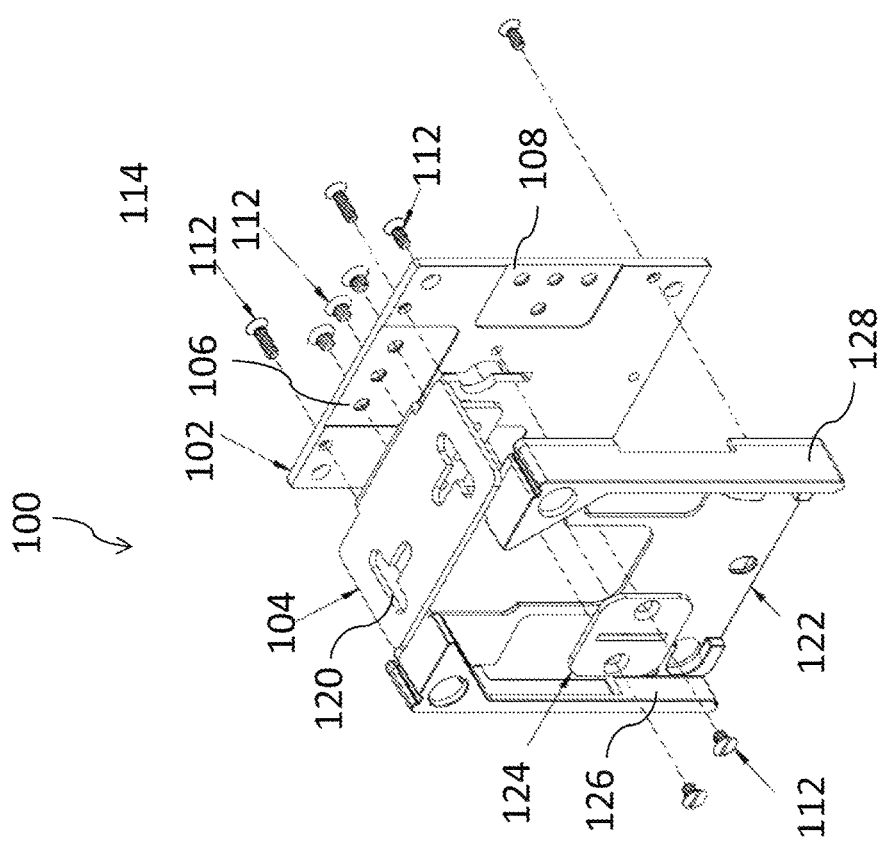
FIG. 2A is an exploded view of a mounting bracket in accordance with the present disclosure.

FIGS. 2A and 2B illustrate a mounting bracket 100 with a ceiling mount arrangement for a window covering. The mounting bracket 100 can have a base plate 102, mounting plate 104, bracket housing 122, and retainer assembly 124. The mounting bracket 100 has the mounting plate 104 coupled in the first set of apertures 106 at the top edge 114 of the base plate 102 for a ceiling mount. The bracket housing 122 can couple with the base plate 102 by one or more fasteners 112. In other embodiments, the bracket housing 122 can couple with the base plate 102 with a pressure fit, or press fit, arrangement.

The bracket housing 122 can have an inner surface 126 and an outer surface 128. The inner surface 126 can be shaped to receive a clutch assembly 138 (shown in FIGS. 5A and 5B) and guide the clutch assembly 138 into engagement with the retainer assembly 124. The outer surface 128 can be similarly shaped to maintain appearance, or formed in any polygonal shape for appearance or design or reduce visibility of the mounting bracket 100. As can be appreciated in the illustrated embodiment, the inner surface 126 can have substantially parallel sidewalls and an angled top portion to receive a correspondingly shaped clutch assembly 128, thereby aiding in guiding the clutch into position. As can be seen in more detail with respect to FIGS. 6A and 6B.

The retainer assembly 124 can be coupled with the base plate and adjacent to and abuttingly engaged with the bracket housing. The retainer assembly 124 can be configured to receive the clutch side 140 of the clutch assembly 138 or an idle side of the idle assembly (not shown). The retainer assembly 124 can have a slot 134 formed and configured to receive a protrusion 156 extending from the clutch side of the clutch assembly 138. In some embodiments, as illustrated, the slot 134 can be formed in substantially the center portion of the retainer assembly 124, other locations are possible in other embodiments. A retainer assembly 124 having a slot 134 formed therein can be a clutch plate 158. The protrusion 156 can prevent the clutch assembly 138 from rotating within the mounting bracket 100, thereby engaging the clutch mechanisms within the clutch assembly 138.

Figure 4B:
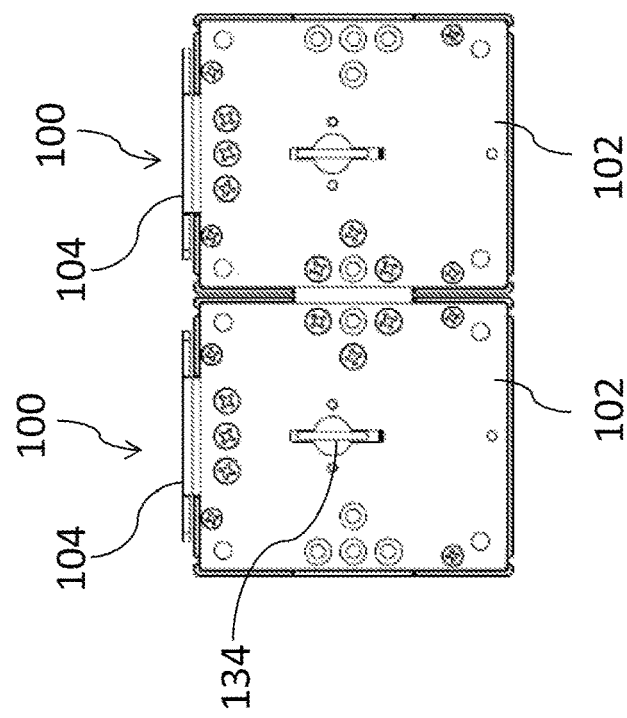
FIG. 4B is a rear view of the mounting bracket of FIG. 4A.
Figure 4A:
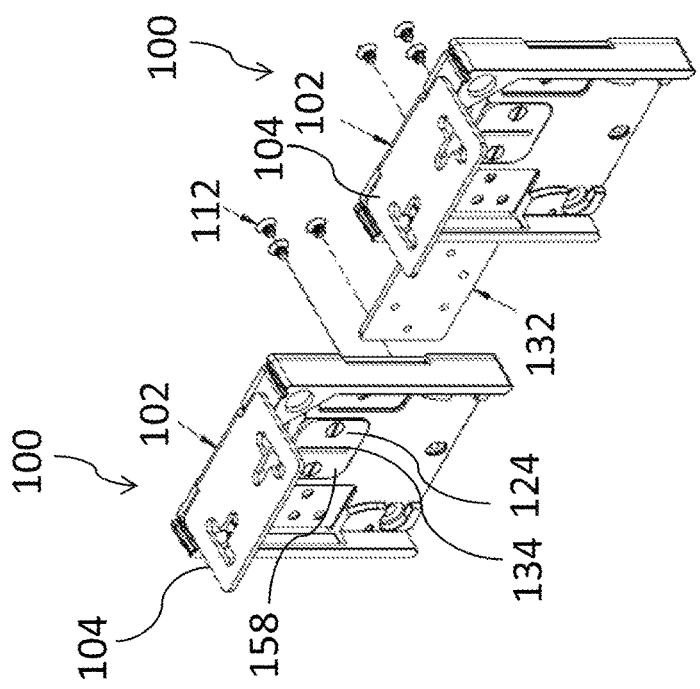
FIG. 4A is an exploded view of a mounting bracket in a third mounting arrangement in accordance with the present disclosure.
Figure 4D:
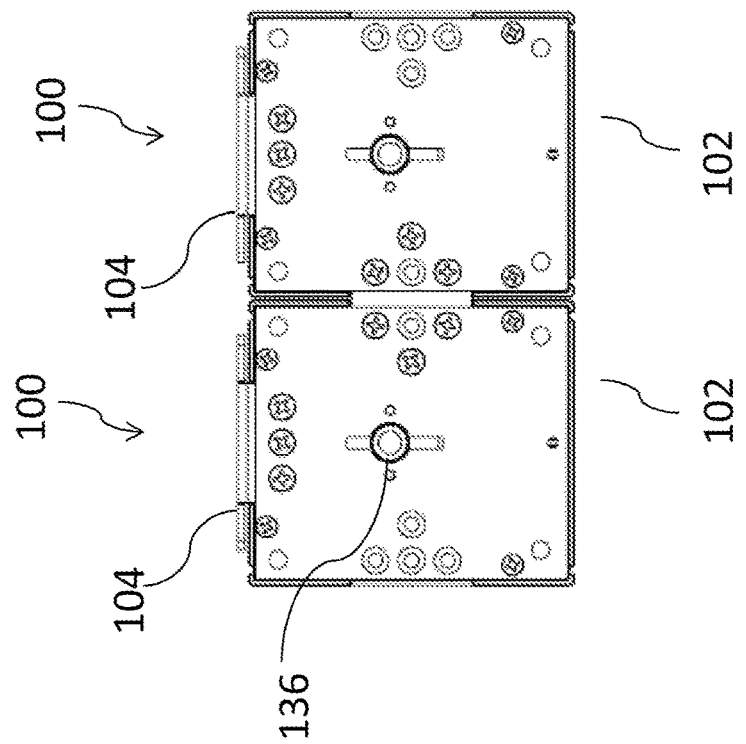
FIG. 4D is an exploded view of the idle plate mounting bracket of FIG. 4C.
Figure 4C:
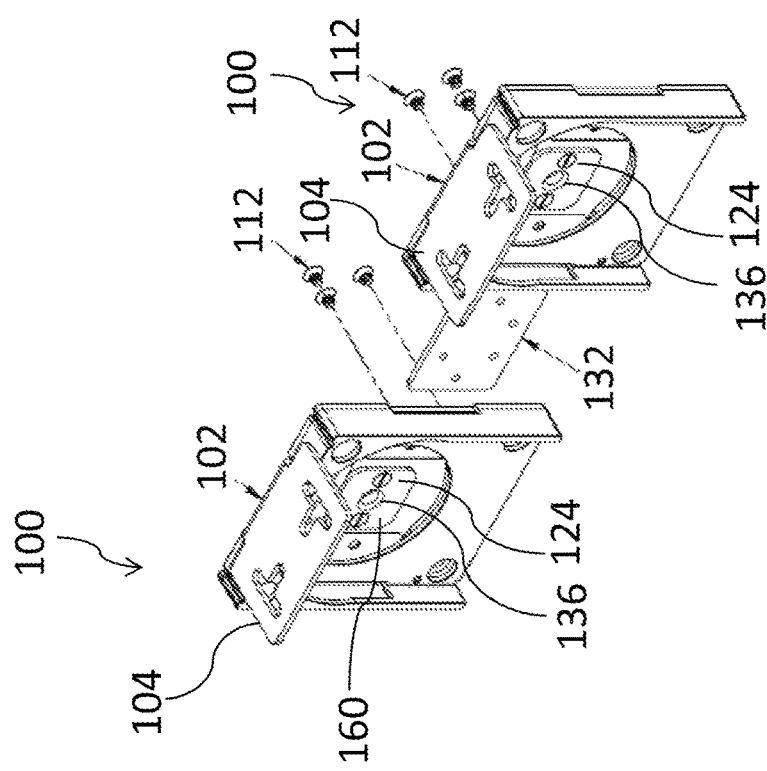
FIG. 4C is an exploded view of an idle plate mounting bracket in a third mounting arrangement in accordance with the present disclosure.

The retainer assembly 124 can alternatively be configured to receive the idle side of the idle assembly (shown in FIGS. 4C and 4D). The retainer assembly 124 can have an aperture 136 formed therein and configured to receive a tubular protrusion (not shown) extending from the idle side of the idle assembly. The idle assembly can be a free spinning tubular protrusion, a bearing, or other arrangement, coupled with an end of a longitudinally extending window covering opposite the clutch assembly 138. In some embodiments, the aperture 136 can be formed in substantially the center portion of the retainer assembly 124, other locations are possible in other embodiments. A retainer assembly 124 having an aperture 136 formed therein can be an idle plate 160. The tubular protrusion can allow the window covering to rotate freely within the mounting bracket 100, thus the "idle side".

Figure 3B:
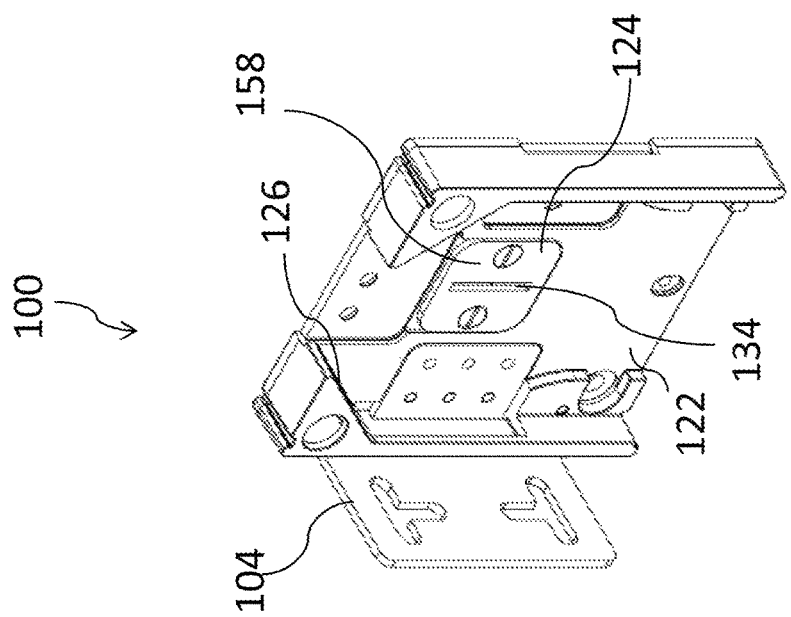
FIG. 3B is an assembled view of the mounting bracket of FIG. 3A.
Figure 3A:
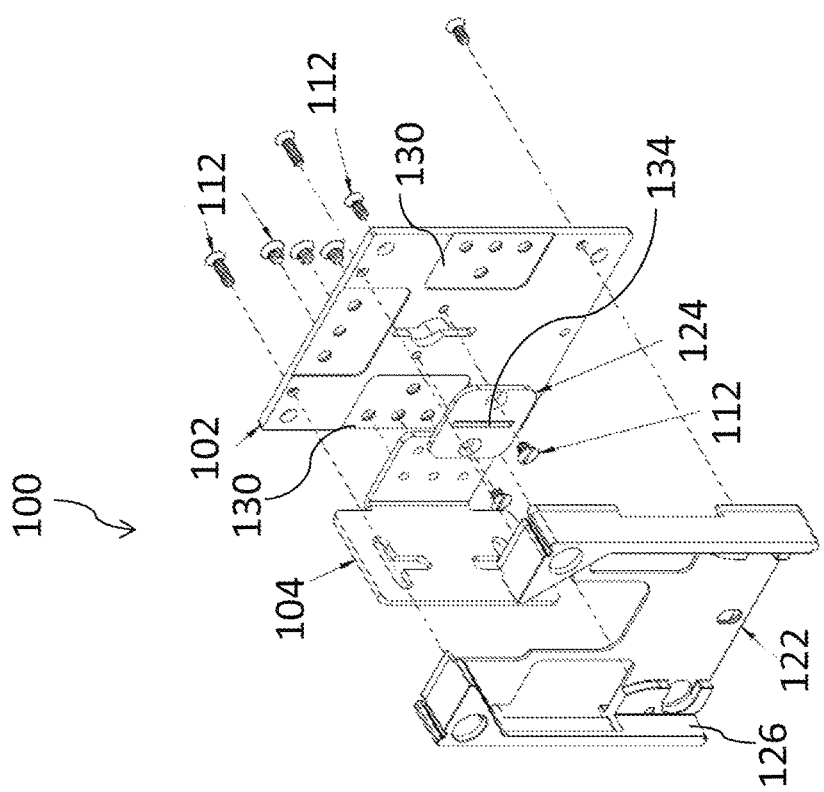
FIG. 3A is an exploded view of a mounting bracket in a second mounting arrangement in accordance with the present disclosure.

FIGS. 3A and 3B illustrate a mounting bracket 100 having the mounting plate 104 coupled in the third set of apertures 110 at the left edge 118 of the base plate 102. The mounting plate 104 coupled at the third set of apertures 110 transitions the mounting apertures 120 to face the left edge 118. As can be appreciated in FIGS. 3A and 3B, the mounting plate 104 is secured to the base plate 102 using four fasteners 112.

The base plate 102 can have recessed mounting plate receiving portions 130 to allow flush mounting of the mounting plate 104 and the inner surface 126 of the bracket housing 122. For example, the recessed mounting plate receiving portions can have a recess distance from a surface of the base plate that corresponds to a thickness of the mounting plate. The recessed mounting plate receiving portions 130 can vary in depth depending on the thickness of the utilized mounting plate 104 and the thickness of the bracket housing 122. In some embodiments, recessed mounting plate receiving portions 130 can be omitted.

FIGS. 4A and 4B illustrate two mounting brackets 100 coupled together by a joiner plate 132. The joiner plate 132 can couple two mounting brackets 100 adjacent to one another. The joiner plate 132 can utilize the second set of apertures 108 and/or third set of apertures 110 on the base plate. As illustrated, each mounting plate 104 is received in the first set of apertures 106. However, in other embodiments, the mounting plate 104 can be coupled in any of the first set of apertures 106, second set of apertures 108, and third set of apertures 110 not being utilized by the joiner plate 132.

In the illustrated embodiment, the a first mounting bracket is coupled with the joiner plate 132 at the second set of apertures 108 and a second mounting bracket is coupled with the joiner plate 132 at the third set of apertures 110. The joiner plate 132 can allow implementations of more than one window covering (not shown) within a single mounting bracket arrangement. While two mounting brackets are shown, it is within the scope of the disclosure to implement additional joiner plates 132 to couple additional mounting brackets 100 one to the other.

The retainer assembly 124 is shown having a slot 134 formed therein to receive a protrusion 156 extending from the clutch assembly 138.

FIGS. 4C and 4D illustrate the idle side of two mounting brackets coupled together by a joiner plate 132. The joiner plate 132 is received within the second set of apertures 108 on the first mounting bracket and in the third set of apertures 110 on the second mounting bracket. The idle side retainer assembly 124 has an aperture 136 formed therein to receive a tubular protrusion (not shown).

FIGS. 5A and 5B illustrate a clutch assembly 138 configured to be receiving within the mounting bracket 100. The clutch assembly 138 can have a first end 140 and a second end 142 opposite the first end 140. The first end 138 can have a base 144 correspondingly shaped to be received within the inner surface 126 of the bracket housing 122. The base 144 can have a spindle 146 extended away therefrom and configured to receive one or more springs 148, a sprocket wheel 150, a drum 152, and a clutch adapter 154. The one or more springs 148 can provide tension to the clutch assembly 138 and allow smooth operation of the window covering (not shown). Smooth operation of the window covering can prevent the window covering from displacing, downward or upward, without movement from a user while also requiring a consistent pull-force throughout operation of the window covering. The smooth operation can additionally allow the window covering to move at a steady pace as it transitions between deployed and undeployed positions.

The protrusion 156 can extend away from the base 144 opposite the spindle 146. The protrusion 156 can be a substantially rectangular tab, or any other shape configured to be received within the slot 134. In some embodiments, the slot 134 and protrusion 156 can be cross shaped, star shaped, or any other shape capable to preventing rotation of the clutch assembly 138 within the mounting bracket 100.

Figure 6A:
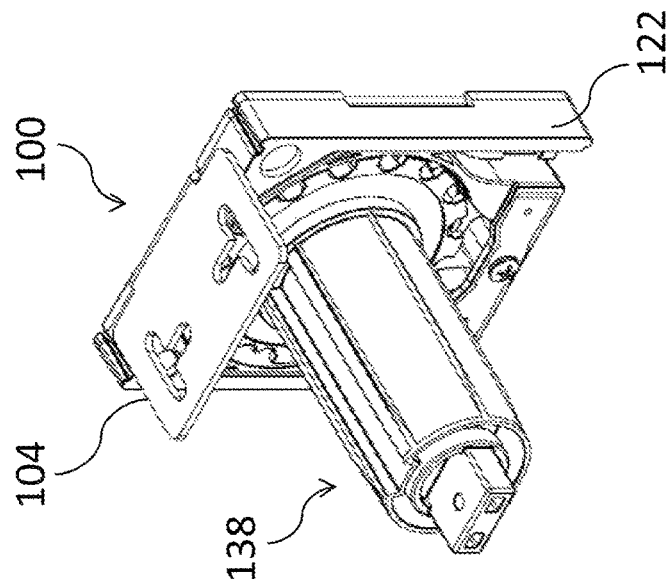
FIG. 6A is an exploded view of a mounting bracket system in accordance with the present disclosure.
Figure 6B:
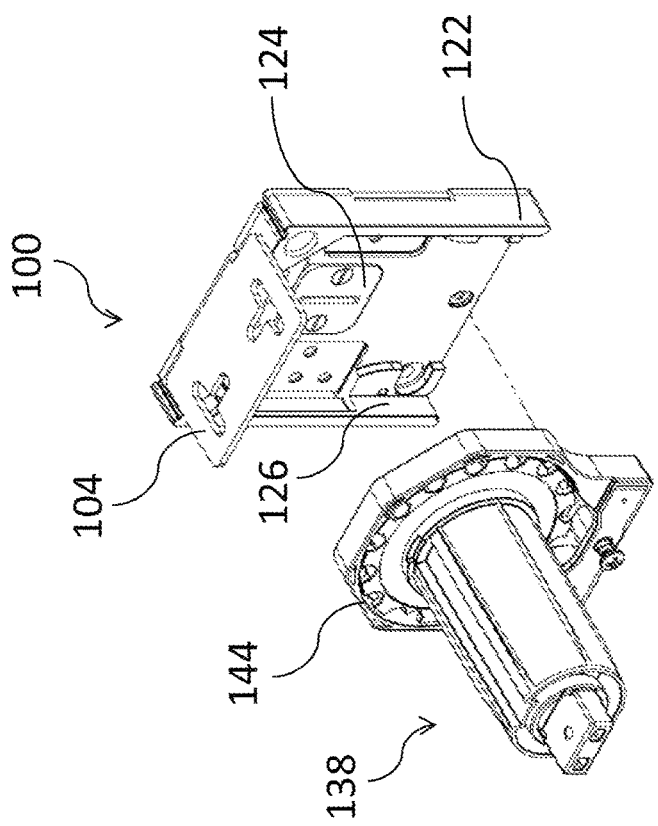
FIG. 6B is an assembled view of the mounting bracket system of FIG. 6A.

FIGS. 6A and 6B illustrate a clutch assembly 138 received within a mounting bracket 100. The clutch assembly 138 can be secured to the mounting bracket 100 with one or more fasteners 112. The base 144 of the clutch assembly 138 can have a shape corresponding to the inner surface 126 of the bracket housing 122. The corresponding shape of the base 144 and inner surface 126 provides a secure coupling while eliminating improper mounting.

In some embodiments, the base 144 can have a substantially octagonal shape and the inner surface 126 of the bracket housing 122 can have a correspondingly octagonal shape to receive the clutch assembly 138. In other embodiments, the base 144 can have rectangular, pentagonal, hexagonal, or other polygonal shape and the inner surface 126 of the bracket housing 122 can have a correspondingly polygonal shape.

Figure 7B:
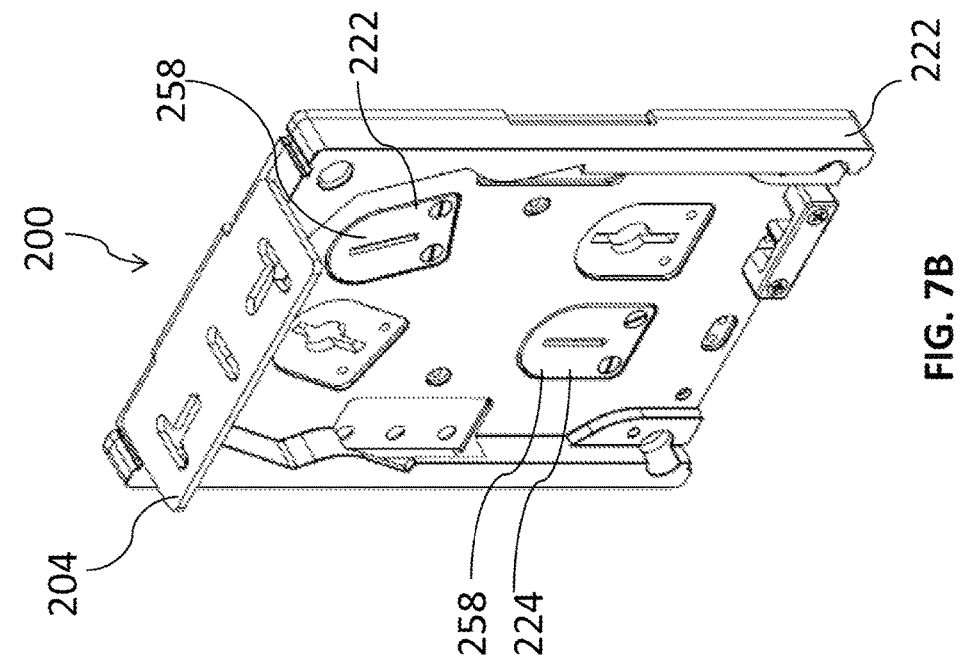
FIG. 7B is an assembled view of the mounting bracket of FIG. 7A.
Figure 7A:
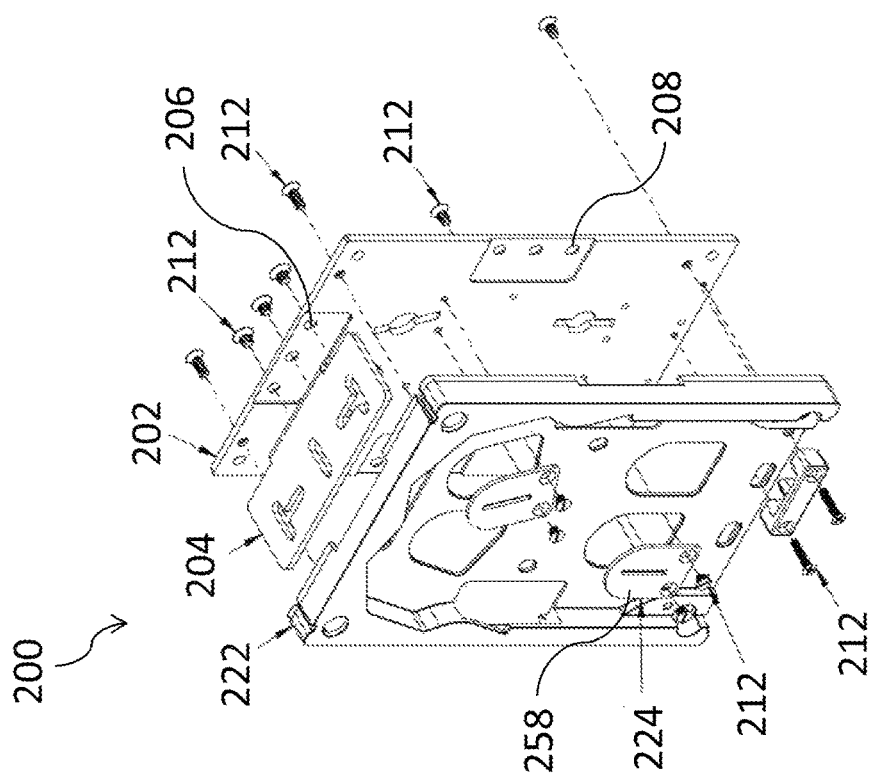
FIG. 7A is an exploded view of a second embodiment of a mounting bracket in accordance with the present disclosure.

FIGS. 7A and 7B illustrate a second embodiment of a mounting bracket 200. The mounting bracket 200 can receive four retainer assemblies 224 therein and provide mounting for more than one window covering (not shown) within a single mounting bracket 200. The mounting bracket 200 can provide a first set of apertures 206, a second set of apertures 208, and a third set of apertures 210 to allow multiple mounting orientations for the mounting plate 204. Additionally, the first set of apertures, second set of apertures 208, and third set of apertures 210 can allow the implementation of one or more joiner plates (not shown) to couple two mounting brackets 200 together. The joiner plate for mounting bracket 200 can be substantially similar to joiner plate 132 of mounting bracket 100.

Mounting bracket 200 can receive four retainer assemblies 224 to allow positioning of two clutch plates 258 and/or two idle plates 160 (shown in FIG. 4C). The arrangement of clutch plates 258 and/or idle plates 160 can provide flexibility between right handed control and left handed control when installing two window coverings within a mounting bracket 200. As can be appreciated in FIGS. 7A and 7B, the mounting bracket 200 can receive two clutch plates 258 diagonally opposed one from the other. The diagonal offset allows for the mounting bracket 200 to receive two clutch assemblies 138 (shown in FIGS. 5A and 5B) simultaneously. The diagonal offset can be reversed to accommodate both left and right hand drive operations.

In some embodiments, the mounting bracket 200 can receive four retainer assemblies 224, a first mounting bracket 200 receiving two clutch plates 258 diagonally opposed and a second mounting bracket 200 receiving two idle plates in opposing diagonally positions to provide a mirror image of the first mounting bracket 100. A window covering (not shown) and clutch assembly 138 can be disposed between the first mounting bracket 200 and the second mounting bracket 200.

The mounting brackets, in accordance with embodiments of the disclosure, can be in variety of shapes and configurations to allow for mounting of different sizes and shapes of window coverings. For example, the mounting bracket can be scaled in size to support the weight and/or components for a window covering.

The mounting brackets can also be designed to accept fascia or other decorative cover. In some embodiments, the mounting brackets can be configured to receive fascia on either face side (i.e. a side of the bracket that is disposed parallel to the window area) of the mounting bracket. A face side is often references as a "front" or "rear" depending on how the mounting bracket has been mounted in relation to the room and/or window area. In embodiments, the mounting bracket can accept front fascia (i.e. fascia on the front face), rear fascia (i.e. fascia on the rear face), or combinations thereof. The fascia can be affixed to the mounting bracket through the bracket housing via any suitable method known in the art.

It is believed the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiments of the disclosure.

What is claimed is:

1. A mounting bracket comprising:
   a base plate, the base plate having a first set of discrete apertures, a second set of discrete apertures, and a third set of discrete apertures formed therein;
   a mounting plate couplable with one of the first set of discrete apertures, the second set of discrete apertures, and the third set of discrete apertures the second set of discrete apertures formed in the base plate;
   a bracket housing couplable with the base plate, the bracket housing having an inner surface and an outer surface; and
   a retainer plate detachably coupled with the base plate and adjacent to and abuttingly engaged with the bracket housing, wherein the retainer plate is operable to engage with a clutch assembly or an idle assembly,
   wherein the first set of discrete apertures is formed proximate a top edge of the base plate, the second set of discrete apertures is formed proximate a right edge of the base plate, and the third set of discrete apertures is formed proximate a left edge of the base plate.

2. The mounting bracket of claim 1, wherein the retainer plate is a clutch plate configured to receive a clutch side of the clutch assembly.

3. The mounting bracket of claim 2, wherein the clutch plate has a slot configured to receive the clutch assembly.

4. The mounting bracket of claim 3, wherein the clutch assembly further comprises a protrusion, wherein the protrusion is received in the slot.

5. The mounting bracket of claim 1, wherein the retainer assembly is an idle plate configured to receive an idle side of an idle assembly.

6. The mounting bracket of claim 5, wherein the idle plate has an idle aperture configured to receive the idle assembly.

7. The mounting bracket of claim 1, wherein the base plate is coupled with the bracket housing by one or more fasteners.

8. The mounting bracket of claim 1, wherein the base plate is coupled with the bracket housing by a press fit arrangement.

9. The mounting bracket of claim 1, wherein the inner surface of the bracket housing is shaped to receive a correspondingly shaped clutch assembly.

10. The mounting bracket of claim 1, further comprising a clutch assembly, wherein the clutch assembly is secured to the bracket housing via a fastener.

11. A mounting bracket system comprising:
a first mounting bracket comprising: a base plate, the base plate having a first set of discrete apertures, a second set of discrete apertures, and a third set of discrete apertures formed therein;
a mounting plate couplable with one of the first set of apertures, the second set of apertures, and the third set of discrete apertures formed in the base plate;
a bracket housing couplable with the base plate, the bracket housing having an inner surface and an outer surface; and
a clutch plate coupled with the base plate and adjacent to and abuttingly engaged with the bracket housing;
a second mounting bracket comprising:
a base plate, the base plate having a first set of apertures and a second set of apertures formed therein; a mounting plate couplable with one of the first set of apertures and the second set of apertures formed in the base plate;
a bracket housing couplable with the base plate, the clutch plate having an inner surface and an outer surface; and
an idle plate coupled with the base plate and adjacent to and abuttingly engaged with the bracket housing;
a longitudinally extending clutch assembly,
wherein the clutch plate is configured to receive a clutch side of the clutch assembly, and the idle plate is configured to receive an idle side of an idle assembly, wherein the first set of discrete apertures is formed proximate a top edge of the base plate, the second set of discrete apertures is formed proximate a right edge of the base plate, and the third set of discrete apertures is formed proximate a left edge of the base plate.

12. The mounting bracket of claim 11, wherein the clutch date has a slot formed in substantially a center portion configured to receive the clutch assembly.

13. The mounting bracket of claim 11, wherein the idle plate has an idle aperture formed in substantially a center portion configured to receive the idle assembly.

14. The mounting bracket of claim 11, wherein the base plate is coupled with the bracket housing by one or more fasteners.

15. The mounting bracket of claim 11, wherein the base plate is coupled with the bracket housing by a press fit arrangement.

16. The mounting bracket of claim 11, wherein the base plate is configured to receive a joiner plate in one of the first set of apertures and the second set of apertures, the joiner plate coupling the base plate with a second base plate.

17. The mounting bracket of claim 11, further comprising a second retainer assembly configured to receive a second clutch assembly.

18. The mounting bracket of claim 11, wherein the inner surface of the bracket housing is correspondingly shaped to receive the clutch assembly.

* * * * *